United States Patent
Freytsis et al.

(10) Patent No.: US 8,103,282 B2
(45) Date of Patent: Jan. 24, 2012

(54) METHODS AND APPARATUS FOR ALLOCATING RESOURCES IN A DISTRIBUTED ENVIRONMENT BASED ON NETWORK ASSESSMENT

(75) Inventors: Ilya Freytsis, Swampscott, MA (US); Ran Ish-shalom, Newton, MA (US); Benny Rodrig, Lexington, MA (US)

(73) Assignee: Avaya Inc., Basking Ridge, NJ (US)

(*) Notice: Subject to any disclaimer, the term of this patent is extended or adjusted under 35 U.S.C. 154(b) by 602 days.

(21) Appl. No.: 11/238,169

(22) Filed: Sep. 28, 2005

(65) Prior Publication Data

US 2007/0072618 A1 Mar. 29, 2007

(51) Int. Cl.
*H04W 72/00* (2009.01)
*H04M 3/42* (2006.01)

(52) U.S. Cl. .............. 455/450; 455/414.1; 370/329

(58) Field of Classification Search .......... 455/450–453, 455/414, 414.1, 414.3; 718/104; 370/329–330
See application file for complete search history.

(56) References Cited

U.S. PATENT DOCUMENTS

| | | | | |
|---|---|---|---|---|
| 5,987,011 | A * | 11/1999 | Toh ............................. | 370/331 |
| 6,456,601 | B1 * | 9/2002 | Kozdon et al. ............... | 370/259 |
| 7,173,911 | B1 * | 2/2007 | Sarkar et al. .................. | 370/252 |
| 2001/0039585 | A1 * | 11/2001 | Primak et al. ................. | 709/228 |
| 2002/0059453 | A1 * | 5/2002 | Eriksson et al. .............. | 709/238 |
| 2002/0069279 | A1 | 6/2002 | Romero et al. | |
| 2002/0136384 | A1 * | 9/2002 | McCormack et al. ... | 379/215.01 |
| 2003/0032409 | A1 * | 2/2003 | Hutcheson et al. ........... | 455/414 |
| 2003/0207697 | A1 * | 11/2003 | Shpak ........................... | 455/524 |
| 2004/0082338 | A1 * | 4/2004 | Norrgard et al. ........... | 455/452.2 |
| 2004/0172470 | A1 * | 9/2004 | Shiina .......................... | 709/224 |
| 2005/0076339 | A1 * | 4/2005 | Merril et al. ................. | 718/104 |

FOREIGN PATENT DOCUMENTS

| | | |
|---|---|---|
| EP | 1 324 546 A1 | 7/2003 |
| WO | WO 01/90903 A1 | 11/2001 |
| WO | WO 01/93109 A2 | 12/2001 |

* cited by examiner

*Primary Examiner* — Lester Kincaid
*Assistant Examiner* — Daniel Lai
(74) *Attorney, Agent, or Firm* — Chapin IP Law, LLC; David W. Rouille, Esq.

(57) ABSTRACT

Methods and apparatus are provided for allocating resources in a distributed environment, such as a packet network, based on a network assessment. One or more resources are allocated to a request in a distributed environment by identifying one or more potential resources to handle the request; obtaining a network connection assessment between the requester and the one or more potential resources; and assigning at least one of the one or more potential resources to the request based on the evaluation. The network connection assessment can assess, for example, a quality of a network connection between the requester and each of the one or more potential resources or evaluate a topology of the network connection between the requester and each of the one or more potential resources. The one or more resources can be selected based on a score assigned to each of the one or more potential resources.

20 Claims, 2 Drawing Sheets

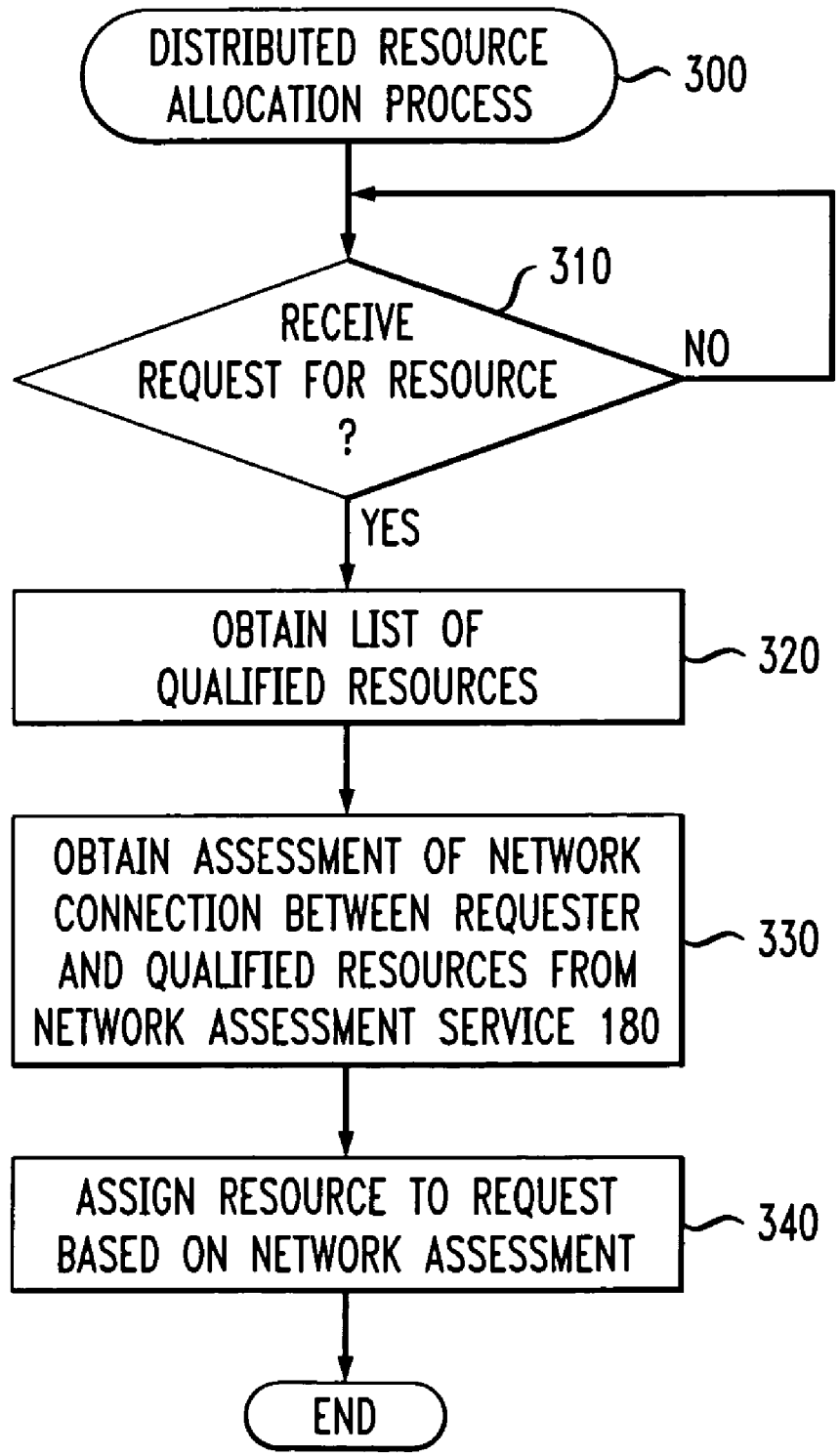

METHODS AND APPARATUS FOR ALLOCATING RESOURCES IN A DISTRIBUTED ENVIRONMENT BASED ON NETWORK ASSESSMENT

FIELD OF THE INVENTION

The present invention relates generally to techniques for allocating resources, and more particularly, to methods and apparatus for allocating resources in a distributed environment based on an assessment of the network.

BACKGROUND OF THE INVENTION

For many enterprise applications, finite resources must be allocated among a number of requests for such resources. Resource allocation systems typically attempt to balance the work load among resources that are available at the time the resource allocation request is received. In a packet network environment, for example, in order to facilitate a media session between users, one of many available suitable resources must be selected. For example, a resource allocation system may be required to allocate hardware resources required by the media session, such as audio/video conference servers, announcement servers, Interactive Voice Response (IVR) systems, media gateways and allocating a Network Attached Storage (NAS) driver in a storage application.

Existing resource allocation systems typically select one of multiple qualified resources either arbitrarily or based on a known available capacity. For example, a number of resource allocation systems are based on manually configured hierarchical static resource groupings. Such existing resource allocation systems, however, are insensitive to the current state of the network, such as the session quality and network load. In a multi-resource environment, a media resource must be selected such that the selected resource is capable of satisfactorily performing the desired service and can also sustain the desired session quality. A need therefore exists for methods and apparatus for allocating resources in a distributed environment that dynamically react to changing network conditions. A further need exists for methods and apparatus for allocating resources in a distributed environment that allocate resources based on a topological proximity within the network of the requester to the requested resource.

SUMMARY OF THE INVENTION

Generally, methods and apparatus are provided for allocating resources in a distributed environment, such as a packet network, based on a dynamic network assessment. According to one aspect of the invention, one or more resources are allocated to a request in a distributed environment by identifying one or more potential resources to handle the request; obtaining a network connection assessment between the requester and the one or more potential resources; and assigning at least one of the one or more potential resources to the request based on the evaluation.

The network connection assessment can assess, for example, a quality of a network connection between the requester and each of the one or more potential resources or evaluate a topology of the network connection between the requester and each of the one or more potential resources. The network connection quality can evaluate, for example, one or more of a type of connectivity, a topological assessment or a session quality assessment. The one or more resources can be selected based on a score assigned to each of the one or more potential resources.

A more complete understanding of the present invention, as well as further features and advantages of the present invention, will be obtained by reference to the following detailed description and drawings.

BRIEF DESCRIPTION OF THE DRAWINGS

FIG. 3 is a flow chart describing an exemplary implementation of a distributed resource allocation process incorporating features of the present invention.

DETAILED DESCRIPTION

The present invention provides methods and apparatus for allocating resources in a distributed environment that dynamically react to changing network conditions. In particular, the disclosed resource allocation techniques make resource allocation decisions based on an assessment of network connection quality or a proximity within the network between the requester to the requested resource (or both). Thus, the present invention provides a quality sensitive resource allocation algorithm that considers both the real time state of the network (e.g., configuration and performance) and application specific resource characteristics (e.g., resource capabilities, capacity and load). While the present invention is primarily illustrated in the context of resources within a packet network, the present invention can be applied to any situation where the selection of a resource from a pool of available resources is required, as would be apparent to a person of ordinary skill in the art. The present invention can be applied to the allocation of hardware resources, such as audio/video conference servers, announcement servers, Interactive Voice Response (IVR) systems, and media gateways, as well as the allocation of human resources, such as call center agents, as well as any other resource where multiple qualified resources are available to serve a service request.

Figure 1:
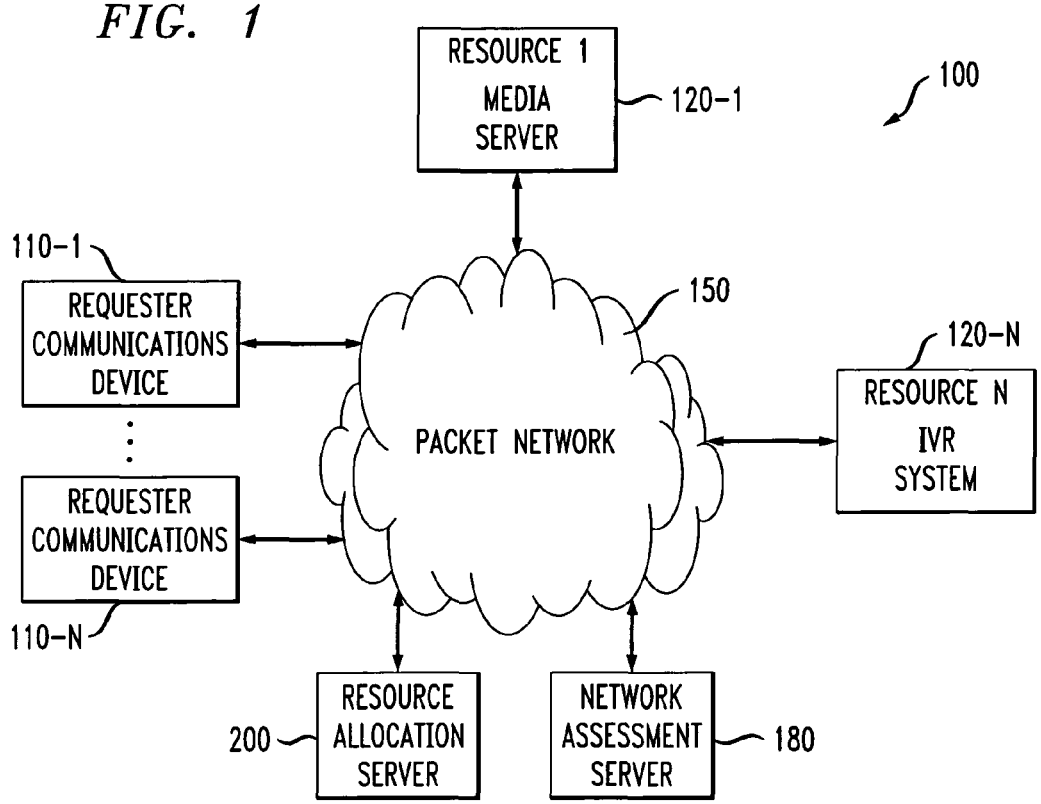
FIG. 1 is a block diagram of a network environment in which the present invention can operate.

FIG. 1 illustrates an exemplary network environment 100 in which the present invention can operate. As shown in FIG. 1, one or more requesters each employing a communications device 110-1 through 110-N is connected with one or more resources 120-1 through 120-N, such as a media server or an IVR system, over a network 150, such as a packet network. The packet network 150 may be implemented, for example, as an Internet Protocol (IP) network, such as the Internet, based on, for example, an IPv4 or IPv6 network, or a combination thereof.

According to one aspect of the invention, the resource allocation request is processed by a resource allocation server 200, discussed further below in conjunction with FIG. 2. As used herein, a resource allocation request can be an implicit or explicit attempt to connect a requester 110 with one or more resources 120. It is noted that a resource allocation request can be initiated by the requester 110 or a third party, such as an application. For example, in a music-on-hold application, a requester 110 can be speaking with a third party on the telephone and the third party puts the requester 110 on hold. The telephone of the third party can instruct an associated call control application to play music to the requester. Thus, even before the telephone of the requester 110 is notified of any change and gets a chance to request anything, the third party call control application will select an appropriate music-on-hold resource for the requester 110 using the present invention and will then instruct the telephone of the requester 110 to connect to the selected music-on-hold resource. It is further noted that a resource allocation request can attempt to connect one or more requesters 110 with one or more resources 120. For example, in a conferencing application, multiple requesters 110 may be connected to a conferencing resource 120, or to multiple conferencing resources 120.

Generally, the resource allocation server 200 makes resource allocation decisions based on an assessment of the network connection between the requester 110 and the one or more potential resources 120. For example, the resource allocation server 200 can assess the quality of the network connection or a proximity within the network 150 between the requester to the requested resource (or both). In one variation, the resource allocation server 200 can be part of an application that controls the resource itself, such as a call control application.

In the exemplary embodiment shown in FIG. 1, the network connection assessment is performed by a network assessment server 180 that is separate from the resource allocation server 200. It is noted, however, that the network connection assessment functionality could also be integrated with the resource allocation server 200, as would be apparent to a person of ordinary skill in the art.

Figure 2:
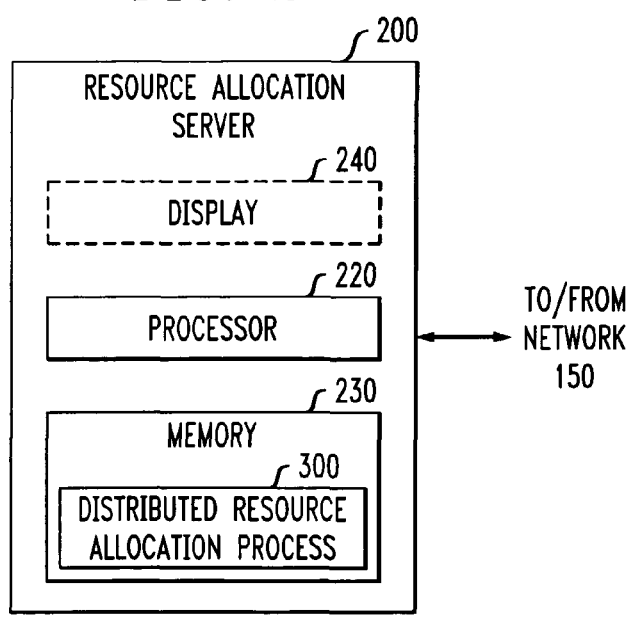
FIG. 2 is a block diagram of a resource allocation server of FIG. 1.

FIG. 2 is a block diagram of a resource allocation server 200 that can implement the processes of the present invention. The resource allocation server 200 can be embodied as a conventional resource allocation system, as modified herein to provide the features and functions of the present invention. As shown in FIG. 2, memory 230 configures the processor 220 to implement the resource allocation methods, steps, and functions disclosed herein (collectively, shown as the distributed resource allocation process 300 in FIG. 2, and discussed further below in conjunction with FIG. 3). The memory 230 could be distributed or local and the processor 220 could be distributed or singular. The memory 230 could be implemented as an electrical, magnetic or optical memory, or any combination of these or other types of storage devices. It should be noted that each distributed processor that makes up processor 220 generally contains its own addressable memory space. It should also be noted that some or all of computer system 200 can be incorporated into an application-specific or general-use integrated circuit.

The present invention can be employed in any distributed resource environment. The system can include several different deployments, including (i) multiple resource allocation servers 200 in a single physical location, where each resource allocation server 200 is assigned service classes for a subset of the resource requests that arrive in that location; (ii) multiple resource allocation server 200 in a single physical location, where each resource allocation server 200 is assigned service classes for requests that arrive in different physical locations within the location; (iii) one resource allocation server 200 in each location, where each resource allocation server 200 is assigned service classes for requests that arrive in the same physical location as the resource allocation server 200; or (iv) one resource allocation server 200 in only some of the physical locations, where a resource allocation server 200 can be assigned service classes for requests that arrive in more than one physical location. For example, in an exemplary call routing system, a contact center with one location in the United States and three locations in Europe can deploy one resource allocation server 200 to handle requests that arrive in the United States and a second resource allocation server 200 to handle requests that arrive in all locations in Europe.

Among other functions, the distributed resource allocation servers 200 ensure that qualified and available resources are matched with a request. In various implementations, the resource allocation servers 200 can match resource requests with local or remote resources. Thus, each resource allocation server 200 can maintain the state of its own service classes (i.e., resources) and the service classes for all other resource allocation server 200 in the system. Each resource allocation server 200 obtains information about the state of service classes in the other resource allocation server 200 from a service class summary record. In one exemplary implementation, the service class information is exchanged, for example, using a publish/subscribe mechanism. This record is shared between all resource allocation servers 200 in the system.

FIG. 3 is a flow chart describing an exemplary implementation of a distributed resource allocation process 300 incorporating features of the present invention that may be implemented by the resource allocation server 200 of FIG. 2.

As shown in FIG. 3, the distributed resource allocation process 300 is initiated during step 310 upon receipt of a request for a managed resource. Once it is determined during step 310 that a request for a managed resource has been received, an available managed resource is matched with a request during the following steps. The distributed resource allocation process 300 obtains a list of available qualified resources during step 320. The list of available qualified resources may be obtained in a conventional manner, for example, using a dynamic or static process. For example, in a dynamic process, the resource allocation process 300 can dynamically identify the qualified resources that are currently available using a polling process or by accessing a registry indicating the current status of each resource, such as the publish/subscribe system mentioned above. A static process may access registration information that identifies the qualified resources.

The distributed resource allocation process 300 then obtains an assessment of the network connection between the requester 110 and the qualified resources 120 from the network assessment service 180. It is noted that in a further variation, the resource allocation server 200 can perform the network quality assessment itself, as indicated above. It is further noted that the assessment of network connection quality need not be performed "on-demand." Rather, the assessment may be performed continuously in the background with assessment results, e.g., scores, stored and updated wherever a change is detected. These available scores are then used when needed to facilitate the resource selection decision.

In one embodiment, the quality assessment can be based on, for example, the type of connectivity, a topological assessment or a session quality assessment (or a combination thereof. The quality assessment may be based on passive measurements, such as monitoring on-going traffic, or on active measurements, such as generated test messages, or a combination thereof. The quality evaluation of a network connection (for either passive or active measurements) can be based on measurements of network forwarding characteristics, including delay, jitter, loss or a combination thereof.

The topological assessment evaluates the proximity of the requester and each available resource in the list. For example, a higher score may be assigned to each resource that is connected to the requester via network links of higher bandwidth capacity and/or via a smaller number of network hops, with the highest score assigned to a resource connected to the same LAN (Local Area Network) as the requester. The topological assessment may be discovered dynamically, known by manual configuration, or a combination thereof. The session quality assessment can be based on conventional quality of service techniques that evaluate the quality of the connection between the requester and each available and qualified resource.

It is noted that the network-assessment-based selection criteria can be combined with the application criteria, such as capabilities and load, in accordance with one or more predefined rules or policies. For example, the policy may specify that out of a given list of qualified resources, select the resource with the best network connection quality. In further variations, the policy may specify that out of the list of resources with sufficient network connection quality, select the resource (i) with the lowest load, or (ii) with lowest assessment score. The assessment score can be calculated, for example, using a formula that takes as parameters the weighted ratings of the different selection criteria, and the policy determines the weights or even the formula itself.

A resource is assigned to the request during step 340, based, at least in part, on the network assessment. For example, a resource that is both available and qualified and has the highest quality assessment score can be assigned to the request. In this manner, the distributed resource allocation process 300 identifies resources that are qualified to provide the required service and that can also sustain the desired (or required) session quality.

It is noted that the matching of requests to managed resources can be restricted to resources in a specific location or region, for example, by adding a location qualifier to the resources. The location qualifier can apply to only one site, or to a region (group of sites). The location qualifier can be geographical, or based on the network topography, such as based on IP addresses or sub-networks. In one implementation, during step 330, the distributed resource allocation process 300 can provide the IP address of the requester to the network assessment service 180 and the network assessment service 180 can return the resource(s) that are "local" to the indicated IP address.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A computer-implemented method for allocating one or more resources to a request in a distributed environment in which a computer system performs operations comprising:
receiving the request from a first requester, the first requester currently engaged in a communications session with a third party, the request comprising a request to identify one or more potential resources to be made available to the third party during a temporary halt of the communications session, the one or more potential resources comprising at least one segment of music data to be played to the third party, wherein the at least one segment of music data is played to the third party in accordance with a call control application associated with the first requester;
identifying one or more resources to handle said request;
obtaining a network connection assessment between one or more requesters associated with said request and each of said plurality of potential resources, wherein each of said plurality resources is at least one of a source and a destination for a corresponding one of said network connections, wherein said network connection assessment is performed by a resource allocation service which maintains state of its own service classes and service classes for other resource allocation servers in said system, wherein said resource allocation server obtains said state of service classes in other resource allocation servers from a service class summary record by way of a publish/subscribe mechanism; and
assigning at least one of said plurality of potential resources to said request based on said network connection assessment, wherein assigning includes:
prior to a communications device associated with the third party sensing the temporary halt of the communications session, transmitting an instruction to the communications device, wherein the instruction comprises a command to connect with at least one of said plurality of potential resources assigned to said request, wherein the step of transmitting the instruction is done via the call control application associated with the first requester.

2. The method of claim 1, wherein said identifying step further comprises the step of identifying potential resources that are currently available.

3. The method of claim 1, wherein said network connection assessment further comprises an evaluation of a topology of a network connection between said one or more requesters and each of said plurality of potential resources.

4. The method of claim 3, wherein said topological evaluation is based on one or more of a dynamic assessment or known configuration information.

5. The method of claim 1, wherein said network connection assessment further comprises an evaluation of a quality of a network connection between said one or more requesters and each of said plurality of potential resources, wherein said network connection quality evaluates one or more of a type of connectivity, a topological assessment or a session quality assessment.

6. The method of claim 1, wherein said network connection assessment is combined with one or more application criteria in accordance with a predefined policy.

7. The method of claim 1, wherein said assigning step further comprises the step of evaluating a score assigned to each of said plurality of potential resources.

8. The method of claim 1, wherein said distributed environment comprises a packet network.

9. The method of claim 1, wherein said network connection assessment is performed one or more of continuously, periodically or in response to said request.

10. A computer system comprising:
a memory;
a processor;
a communications interface;
an interconnection mechanism coupling the memory, the processor and the communications interface; and
wherein the memory is encoded with an application allocating one or more resources to a request in a distributed environment, that when performed on the processor, provides a process for processing information, the process causing the computer system to perform the operations of:
receiving the request from a first requester, the first requester currently engaged in a communications session with a third party, the request comprising a request to identify one or more potential resources to be made available to the third party during a temporary halt of the communications session, the one or more potential resources comprising at least one segment of music data to be played to the third party, wherein the at least one segment of music data is played to the third party in accordance with a call control application associated with the first requester;
identify a plurality of potential resources to handle said request;
obtain an assessment of a network connection assessment between one or more requesters associated with said request and each of said plurality of potential resources, wherein each of said plurality of potential resources is at least one of a source and a destination for a corresponding one of said network connections, wherein said network connection assessment is performed by a resource allocation service which maintains state of its own service classes and service classes for other resource allocation servers in said system, wherein said resource allocation server obtains said state of service classes in other resource allocation servers from a service class summary record by way of a publish/subscribe mechanism; and
assign at least one of said plurality of potential resources to said request based on said network connection assessment, wherein assigning includes:
prior to a communications device associated with the third party sensing the temporary halt of the communications session, transmitting an instruction to the communications device, wherein the instruction comprises a command to connect with at least one of said plurality of potential resources assigned to said request, wherein the step of transmitting the instruction is done via the call control application associated with the first requester.

11. The system of claim 10, wherein said network connection assessment further comprises an evaluation of a topology of a network connection between said one or more requesters and each of said plurality of potential resources, wherein said topological evaluation is based on one or more of an automatic assessment or known configuration information.

12. The system of claim 10, wherein said network connection assessment further comprises an evaluation of a quality of a network connection between said one or more requesters and each of said plurality of potential resources.

13. The system of claim 12, wherein said network connection quality evaluates one or more of a type of connectivity, a topological assessment or a session quality assessment.

14. The system of claim 10, wherein said network connection assessment is combined with one or more application criteria in accordance with a predefined policy.

15. The system of claim 10, wherein said processor is further configured to evaluate a score assigned to each of said plurality of potential resources.

16. A non-transitory computer readable storage medium having computer readable code thereon for allocating a resource to a request in a distributed environment, the medium including instructions in which a computer system performs operations comprising:
receiving the request from a first requester, the first requester currently engaged in a communications session with a third party, the request comprising a request to identify one or more potential resources to be made available to the third party during a temporary halt of the communications session, the one or more potential resources comprising at least one segment of music data to be played to the third party, wherein the at least one segment of music data is played to the third party in accordance with a call control application associated with the first requester;
identifying plurality of potential resources to handle said request;
obtaining an assessment of a network connection between one or more requesters associated with said request and each of said plurality of potential resources, wherein each of said plurality of potential resources is at least one of a source and a destination for a corresponding one of said network connections, wherein said network connection assessment is performed by a resource allocation service which maintains state of its own service classes and service classes for other resource allocation servers in said system, wherein said resource allocation server obtains said state of service classes in other resource allocation servers from a service class summary record by way of a publish/subscribe mechanism; and
assigning at least one of said plurality of potential resources to said request based on said network connection assessment, wherein assigning includes:
prior to a communications device associated with the third party sensing the temporary halt of the communications session, transmitting an instruction to the communications device, wherein the instruction comprises a command to connect with at least one of said plurality of potential resources assigned to said request, wherein the step of transmitting the instruction is done via the call control application associated with the first requester.

17. The non-transitory computer readable storage medium of claim 16, wherein said network connection assessment further comprises an evaluation of a topology of a network connection between said one or more requesters and each of said one or more resources.

18. The non-transitory computer readable storage medium of claim 16, wherein said network connection assessment further comprises an evaluation of a quality of a network connection between said one or more requesters and each of said plurality of potential resources.

19. The non-transitory computer readable storage medium of claim 16, wherein said network connection assessment is combined with one or more application criteria in accordance with a predefined policy.

20. The non-transitory computer readable storage medium of claim 16, wherein said one or more programs which when executed further implement the step of evaluating a score assigned to each of said plurality of potential resources.

* * * * *